June 11, 1968  T. L. HEYING ET AL  3,388,090
RESINS AND ELASTOMERS FROM SILOXY CARBORANYL POLYMERS
Filed April 21, 1964
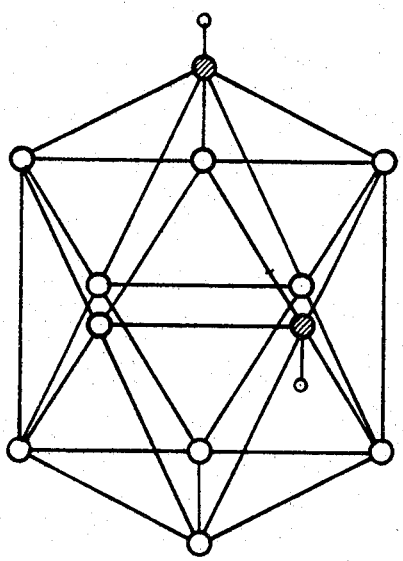
○ BORON
◉ CARBON
o HYDROGEN ON CARBON
(HYDROGEN ATOMS ON
BORON OMITTED FOR
CLARITY)
INVENTORS:
THEODORE L. HEYING
STELVIO PAPETTI
OTTO G. SCHAFFLING
BY Walter D. Hunter
AGENT United States Patent Office 3,388,090
Patented June 11, 1968

3,388,090
RESINS AND ELASTOMERS FROM SILOXY
CARBORANYL POLYMERS
Theodore L. Heying, North Haven, Stelvio Papetti, Hamden, and Otto G. Schaffling, Cheshire, Conn., assignors to Olin Mathieson Chemical Corporation, a corporation of Virginia
Filed Apr. 21, 1964, Ser. No. 361,408
9 Claims. (Cl. 260—37)

ABSTRACT OF THE DISCLOSURE

Polymers having recurring structural units of the formula:

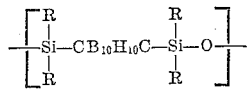

where R is alkyl of from 1 to 12 carbon atoms, are prepared by reacting a bis(alkoxydialkylsilyl) neocarborane with a bis(halodialkylsilyl) neocarborane in the presence of ferric chloride.

---

This invention relates to novel polymers containing both silicon and boron and to a process for their preparation. More particularly, this invention relates to polymers prepared by reacting a bis(alkoxydialkylsilyl) neocarborane and a bis-(halodialkylsilyl) neocarborane in the presence of a catalyst.

The novel polymers of this invention contain a multiplicity of structural units of the following formula:

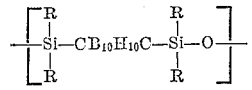

wherein each R substituent is an independently selected alkyl group of from 1 to 12 inclusive carbon atoms. The —CB$_{10}$H$_{10}$C— unit in the above formula is derived from the meta isomer of carborane (i.e., neocarborane) which has the formula:

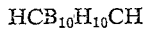

The spatial structure of neocarborane is shown in the drawing.

In the process of this invention polymers containing both silicon and boron are prepared by the condensation of a bis(alkoxydialkylsilyl) neocarborane of the formula:

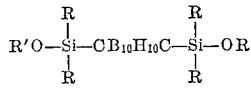

wherein each R substituent is an independently selected alkyl group of from 1 to 12 inclusive carbon atoms and R' is alkyl of from 1 to 6 carbon atoms, with a bis(halodialkylsilyl) neocarborane of the formula:

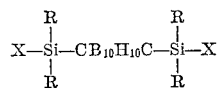

wherein each R substituent is an independently selected alkyl group of from 1 to 12 inclusive carbon atoms and X is a halogen selected from the group consisting of chlorine, bromine and iodine, in the presence of a catalyst.

Bis(halodialkylsilyl) neocarboranes useful as starting materials in the process of this invention can be prepared by the method set forth in Papetti application Ser. No. 310,379, filed Sept. 20, 1963, for Compound and Process. For example, the compound bis(chlorodimethylsilyl) neocarborane can be prepared by first reacting neocarborane and butyl lithium to form dilithioneocarborane and, in a second step, reacting the thus-prepared dilithiocarborane with dichlorodimethylsilane. Useful bis(halodialkylsilyl) neocarboranes include bis(chlorodimethylsilyl)neocarborane,
bis(chlorodiethylsilyl)ethylneocarborane,
bis(chlorodiethylsilyl)neocarborane,
bis(chloromethylethylsilyl) neocarborane,
bis(chlorodi-n-propyl)methylneocarborane,
bis(chlorodi-n-propylsilyl)neocarborane,
bis(chloromethylisoamylsilyl)neocarborane,
bis(chlorodi-n-butylsilyl)neocarborane,
bis(chlorodiisoamylsilyl)neocarborane,
bis(chlorodi-n-hexylsilyl)neocarborane,
bis(cholorodinonylsilyl)neocarborane,
bis(chlorodioctylsilyl)neocarborane,
bis(chlorodidodecylsilyl)neocarborane, etc, and the corresponding bromine and iodine derivatives.

Included in the group of bis(alkoxydialkylsilyl) neocarboranes useful as starting materials are bis(methoxydimethylsilyl)neocarborane,
bis(methoxydiethylsilyl)neocarborane,
bis(methoxymethylethylsilyl)neocarborane,
bis(ethoxydipropylsilyl)-n-butylneocarborane,
bis(ethoxydimethylsilyl)neocarborane,
bis(ethoxydi-n-propylsilyl)neocarborane,
bis(ethoxyethylisopropylsilyl)neocarborane,
bis(n-propoxydiisopropylsilyl)ethylneocarborane,
bis(n-propoxydiisoamylsilyl)neocarborane,
bis(isopropoxydi-n-propylsilyl)neocarborane,
bis(n-butoxydimethylsilyl)neocarborane,
bis(isobutoxydi-n-propylsilyl)neocarborane, etc.

These compounds can be made in the manner described in Heying and Papetti application Ser. No. 361,409, filed April 21, 1964, for Method and Composition. For example, the compound bis(methoxydimethylsilyl) neocarborane can be synthesized by reacting bis(chlorodimethylsilyl) neocarborane for 3 hours at room temperature with an excess of methanol.

The reaction proceeds as shown in the following equations where for purposes of illustration the reaction between bis(methoxydimethylsilyl)neocarborane and bis-(chlorodimethylsilyl)neocarborane in the presence of ferric chloride is shown:

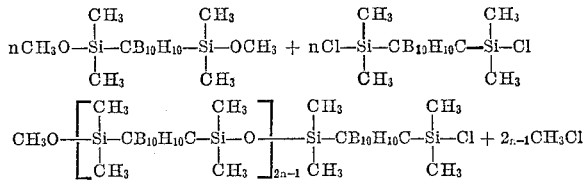

During the course of the reaction the alkyl chloride is given off and by measuring the gas evolved the extent of the reaction can be determined.

The temperature at which the reaction is carried out can be varied widely from about 100° to about 250° C. and preferably will be from about 150° to 190° C. Various temperature ranges have been studied for this reaction and it has been found that the most advantageous temperature at the beginning of the reaction is in the range of from about 140° to 165° C. After about 50 to about 67 percent of the theoretical amount of the gaseous alkyl chloride is evolved, the reaction of the mixture commences to solidify and, at this stage, the reaction appears to cease. Therefore, it has been found desirable in the final stage to raise the temperature to about 175° to about 190° C., at which temperature the gas evolution resumes and in a short period of time the reaction is completed.

The product is then maintained at this final temperature range for about 5 hours or more. Higher temperatures have been investigated for this reaction, but they do not accelerate the rate and temperatures above about 250° C. must be avoided since the catalyst is slowly destroyed at such high temperatures.

The polymeric products of this invention are both solid and liquid. The solid materials melt above about 200° C., the melting point depending upon the molecular weight of the particular product. By the process of this invention polymeric products have a molecular weight from about 1160 to about 100,000 or more and can be conveniently prepared.

The X-ray diffraction pattern of the polymers of this invention is typical of that of a crystalline organic polymer. These polymeric products are soluble, for example, in hot N-methyl-2-pyrrolidone, decalin, chlorobenzene, o-dichlorobenzene, bromobenzene, aniline and xylene.

The amount of the ferric chloride catalyst can be varied from about 0.01 to about 5.0 mole percent, based on the total number of moles of the reactants charged to the reactor and preferably will be from about 0.05 to about 3.0 percent on the same basis. Elimination of the catalyst from the polymer product can be accomplished by grinding the polymer to a fine powder and washing it with acetone or a mixture of acetone and water in which the polymer is practically insoluble. If further purification of the polymer is desired, the product can be recrystallized from xylene or any other of the solvents previously mentioned.

The molecular weight of the products can be determined by the differential vapor pressure techniques at 100° and 130° C. using as a medium o-chlorobenzene or any other suitable material. It has been found that in order to obtain a high molecular weight material, it is necessary to use relatively pure starting materials and to react about 1 mole of the bis(alkoxydialkylsilyl)neocarborane with each mole of the bis(halodialkylsilyl)neocarborane employed.

Example I

Bis (methoxydimethylsilyl) neocarborane (2.46 g., 0.00767 mole), bis(chlorodimethylsilyl)neocarborane 2.53 g., 0.00767 mole) and 2 mole percent of anhydrous ferric chloride (based on the total number of moles of the two neocarborane starting materials added) were mixed in a 25 ml. single-necked flask which was equipped with a stirring bar and a nitrogen inlet line. The reaction flask also was connected to a vacuum line having a bubble-off. A wet-test meter was connected to the bubble-off to measure the gas evolution.

The flask was placed on an oil bath and heat was applied. Gas evolution began at 175° C. and the reaction was completed after 30 minutes at which time the temperature was 225° C. The crude polymeric product was a solid material which was recrystallized from xylene and dried under vacuum at 150° C. for 90 minutes. A total of 3.46 g. of the purified polymer product was recovered (82 percent of the theoretical amount). The molecular weight was determined and found to be 278.0.

The purified polymer was analyzed for carbon, hydrogen, boron and silicon and the following results were obtained:

Calculated for $C_6H_{22}OSi_2$: C, 26.24; H, 8.07; B, 39.40; Si, 20.46. Found: C, 25.51; H, 7.71; B, 38.92; Si, 20.40.

Infrared analysis of the polymeric product, which melted at 230°–260° C., indicated that the product was composed essentially of units corresponding to the following formula:

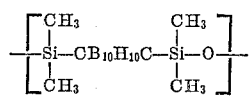

Example II

This experiment was conducted in the same type of apparatus and in a manner identical to that of Example I except that the temperature of the reaction was not raised about 180° C.

Bis (methoxydimethylsilyl) neocarborane (2.758 g., 0.0083 mole), bis (chlorodimethylsilyl)neocarborane (2.662 g., 0.0083 mole) and 2 mole percent of anhydrous ferric chloride (based on the total number of moles of the two neocarboranes added) were reacted together at a temperature of 160° C. for 30 minutes, during which time the mixture solidified, and then at 180° C. for a period of 137 minutes.

The polymeric product was an amorphous solid which gave an X-ray diffraction pattern typical of a crystalline organic polymer. This material was ground, washed several times with acetone and water and dried under vacuum at 200° C. The molecular weight of the recrystallized polymer was determined to be 9500. Yield of the purified polymer was 3.96 g. (M.P. 245°–255° C.), which corresponds to 87 percent based on the theoretical quantity. By infrared analysis the product was determined to be composed of units identical to that of Example I.

Example III

Bis (methoxydimethylsilyl) neocarborane (21.16 g., 0.066 mole), and bis(chlorodimethylsilyl)neocarborane (21.77 g., 0.066 mole) and 2 mole percent of anhydrous ferric chloride (based on the total number of moles of the carborane reactants added) were reacted together in the same manner as described in Example I. The crude product, which had a melting point of 233°–240° C., was recrystallized from xylene. The molecular weight of the purified product was determined and found to be 16,500. A total of 34.8 g. of purified polymer was recovered, which corresponds to a yield of 96.5 percent of the theoretical amount. Infrared analysis showed that the structural units of this product were identical with that of Example I.

Example IV

Bis(chlorodimethylsilyl)neocarbonane (1.009 g., 0.033 mole), bis(methoxydibutylsilyl)neocarbonane (1.625 g., 0.033 mole) and 1 mole percent of anhydrous ferric chloride (based on the number of moles of bis(methoxydibutylsilyl)neocarborane added) were added to a single-necked flask equipped with a condenser, a stirring bar and a nitrogen inlet line. The reaction flask was connected to a vacuum line having a bubble-off to which there was connected a wet-test gas meter.

The reaction was placed on an oil bath and heated to a temperature of about 200° C. at which temperature the evolution of gaseous methyl chloride commenced. Heating of the reactor at a temperature of from 200°–220° C. was continued for three hours during which time small quantities of fresh ferric chloride were added. The crude polymer product, a viscous liquid, was dissolved in ethyl ether and treated with water to dissolve the ferric chloride. Evaporation of the ether layer to dryness gave a viscous, polymeric liquid product which had a molecular weight of 1160. Infrared analysis indicated that the polymer was composed essentially of units of the following structure:

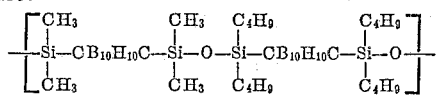

The polymer compositions of this invention can be cured through cross-linking by heating under pressure for from about 1 to about 24 hours or more in the presence of a catalyst to form a wide variety of useful materials. Pressures of from about 200 to about 10,000 p.s.i. can be utilized although, preferably, during the curing process the pressure will be between 500 to 5000 p.s.i. A wide variety of inorganic fillers as exemplified by silica fibre, iron oxide, zinc oxide, titanium dioxide, asbestos, etc., can be mixed with the polymeric composition in an amount of from about one and one-half to about four times the weight of the polymer employed. Useful catalysts include organic or inorganic peroxides such as benzoyl peroxide, caprylyl peroxide, urea peroxide, tertiary-butyl peroxide, lauroyl peroxide, tertiary-butyl perbenzoate, dicumyl peroxide; 2,5-bis(tertiary-butylperoxy)-2,5-dimethylhexane, etc., which can be added in amounts of from about 0.25 percent to about 10.0 percent based on the weight of the polymer utilized.

A composition prepared by mixing 1 part by weight of the polymer product of Example II, 2 parts by weight of silica fibre and 0.1 part by weight of a curing catalyst which was dicumylperoxide dispersed in calcium carbonate, was molded into discs which were cured at various temperatures. The discs, which were formed by pressing a quantity of the composition at 2000–3000 p.s.i. in a 2 inch mold, were maintained under pressure for 1–2 hours at 150° C. then for 1–2 hours at 200° C. and finally at 400° C. for 2–16 hours. All of the discs after the heat treatment were solid, well-cured buttons and examination of these discs indicated that satisfactory polymer flow had been achieved. The discs were homogeneous and did not contain air bubbles. Additional details relating to these curing tests are given in Table I. Tensile strength determinations were made on a number of strips cut from Sample 5 which indicated that the average tensile strength was 894 p.s.i. A sample taken from the cured disc (Sample 5) was held in refluxing acetone for 6.5 hours to test resistance to chemical action. The weight loss was only 2.05 percent with no loss in strength or change in physical appearance.

Thus, the polymer product of this process which possesses excellent resistance to solvent action can be compounded with various mineral fillers and cured with a catalyst, such as dicumylperoxide, to obtain valuable compositions. From such cured polymer compositions gaskets or bushings suitable for use in high pressure and high temperature applications can be prepared. The polymer product of this invention when heated to temperatures above 450° C. show only slight gas evolution.

ing a molecular weight from about 1160 to about 100,000.

2. The product of claim 1 wherein R is —$CH_3$.

3. A curable, linear polymeric condensation product having essentially units of the structure:

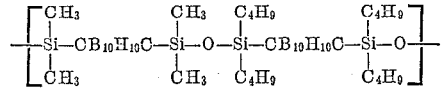

the said curable, linear polymeric condensation product having a molecular weight from about 1160 to about 100,000.

4. A curable composition comprising (A) a linear polymeric condensation product having essentially units of the structure:

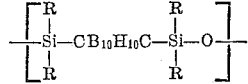

wherein each R substituent is an independently selected alkyl radical of from 1 to 12 inclusive carbon atoms, the said linear polymeric condensation product having a molecular weight from about 1160 to about 100,000, (B) an inorganic filler, and (C) a peroxide catalyst, the amount of the said filler being from about 150 to about 400 percent based on the weight of the linear, polymeric condensation product employed.

5. The curable composition of claim 4, wherein R in the said unit is —$CH_3$.

6. The curable composition of claim 4, wherein the said inorganic filler is silica fibre.

7. The curable composition of claim 4, wherein the said catalyst is dicumylperoxide.

8. The curable composition of claim 4, wherein R in the said unit is —$CH_3$, wherein the inorganic filler is silica fibre and wherein the said catalyst is dicumylperoxide.

9. The product formed by curing the composition of claim 4.

TABLE I

Cured Polymer Compositions:
  Filler: Silica fibre.
  Curing agent: Dicumylperoxide (40 percent by weight despersed in calcium carbonate.

| Sample | Polymer [1]/ Filler Weight Ratio | Final Curing Temperature, °C. | Curing Time Hours | Weight Loss, percent [2] | Remarks |
|---|---|---|---|---|---|
| 1 | 1/2 | 400 | 4 | 13.27 | Coherent fused plate. |
| 2 | 1/2 | 400 | 16 | 16.45 | Do. |
| 3 | 1/2 | 400 | 3 | 10.33 | Do. |
| 4 | 1/2 | 400 | 3 | 12.55 | Do. |
| 5 | 1/2 | 400 | 2 | 9.44 | Do. |

TENSILE STRENGTH TESTS OF SAMPLE NO. 5

| Width, in. | Thickness, in. | Lead, lbs. | Tensile Strength, p.s.i. [3] |
|---|---|---|---|
| 0.20 | 0.11 | 18.0 | 818.0 |
| 0.21 | 0.125 | 27.5 | 1,020.0 |
| 0.19 | 0.115 | 15.0 | 688.0 |
| 0.16 | 0.11 | 18.5 | 1,051.0 |
| | Average 894 p.s.i. | | |

[1] The polymer utilized was the product of Example II.
[2] Includes extrusion of polymer during the curing operation.
[3] Tinius-Olsen apparatus.

What is claimed is:

1. A curable, linear polymeric condensation product having essentially units of the structure:

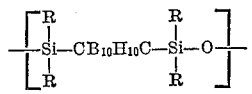

wherein each R substituent is an independently selected alkyl radical of from 1 to 12 inclusive carbon atoms, the said curable, linear polymeric condensation product hav- References Cited

UNITED STATES PATENTS 3,121,117  2/1964  Clark et al. _____ 149—22
3,226,429  12/1965  Grafstein et al. _____ 260—606.5

OTHER REFERENCES

Anony., C & E News, Dec. 9, 1963, pp. 62–70 relied on.

JULIUS FROME, Primary Examiner.

J. E. CALLAGHAN, Assistant Examiner.